Sept. 8, 1953     J. T. LUSIGNAN, JR     2,651,325

VALVE CONTROL MECHANISM

Filed Aug. 14, 1947

INVENTOR.
JOSEPH T. LUSIGNAN JR.
BY

Patented Sept. 8, 1953

2,651,325

UNITED STATES PATENT OFFICE 2,651,325

VALVE CONTROL MECHANISM

Joseph T. Lusignan, Jr., Mansfield, Ohio, assignor to The Ohio Brass Company, Mansfield, Ohio, a corporation of New Jersey Application August 14, 1947, Serial No. 768,553

6 Claims. (Cl. 137—653)

This invention relates to valves of the reciprocating piston type which may be operated to the open and closed positions by line pressure.

Valves of this type may be installed with the piston operating horizontally or vertically.

It is found in this type of valve that under some conditions the piston may be inadvertently moved from its open or closed position through sudden pressure surges in the line to which the valve is attached which act on the piston and effect the movement of the piston.

It is the purpose of the herein disclosed invention to provide means to prevent such inadvertent movement of the piston.

Other objects and advantages will appear from the following description.

The invention and modifications are exemplified by the combination and arrangement of parts shown in the accompanying drawing and described in the following specification, and more particularly pointed out in the appended claims.

In the drawing—

Figure 1:
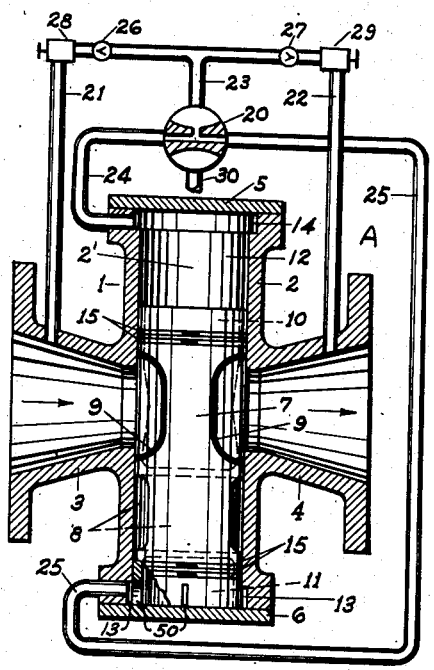
Fig. 1 is a longitudinal view in partial section of the type of valve herein described with the operating system shown schematically.

Fig. 1 shows the type of valve which the herein disclosed invention includes; the body or casing 1 has a cylindrical portion or cylinder 2 which in turn has a cylindrical bore 2' with an inlet port 3 and an outlet port 4 and the ends of the bore are closed by heads 5 and 6.

Within the bore 2' is a piston 7 with an opening 8 therethrough as shown by dotted lines to register with the ports which open into the bore and connect the same when the piston is in its open position.

To seal off the ports 3 and 4 when the valve is closed gaskets 9 are inserted in grooves in the piston face and surround the port openings and engage the face of the bore when the valve is closed (Fig. 1).

The piston is recessed as shown above and below the side walls of the opening 8 and it will be noted that the space 10 within the piston above the opening 8 is much larger than the space 11 below the opening 8 and when the piston is in its closed position as in Fig. 1 the space 11 below the opening 8 is very much less than the space in the upper part of the cylinder comprising the piston space 10 plus the cylinder space 12 later referred to as space Y.

The upper end of the piston may be constructed with an end wall as at the lower end of the piston in which case the space 10 will correspond with the space 11 and the space Y (10+12) will be relatively less than that shown in Fig. 1 and the effect of this difference will be later explained.

The cylinder 2 is provided at its ends with annular recesses 13 and 14 respectively since the fluid pressure is shown as entering the cylinder at the side thereof and not through the cylinder heads.

The piston is provided with rings 15 or other packing means at its ends.

To control the normal operation of the valve A to either its open or its closed position a 4-way valve is used shown schematically at 20, and is connected to the ports 3 and 4 by pipes 21 and 22 respectively and the common pipe 23. The valve 20 is connected to the ends of the cylinder by pipes 24 and 25.

In the pipes 21 and 22 are located check valves 26 and 27 which prevent an interflow of fluid pressure between the ports.

To further control the operating system, hand operated valves 28 and 29 are included in pipes 21 and 22.

By operating the valve 20 clockwise or anticlockwise depending from which port it is desired to take fluid pressure for operating the piston 7, fluid pressure will be admitted to one or the other end of the cylinder and the piston will be moved accordingly to open or close the valve A and at the same time the other end of the cylinder will be connected to atmosphere through the pipe 30.

When the valve A is connected to a pipe line and is under normal operation it is customary to operate the valve 20 to the position shown in Fig. 1 in which case pressure is applied to both ends of the piston at the same time, thus preventing inadvertent movement of the piston under normal fluid pressure since the pressure is equal in both ends of the cylinder to the pipe line pressure, and preventing leakage past the piston and out the pipe 30 as the normal pressure on the system may be as much as 1000 p. s. i.

When the valve A as shown in Fig. 1 is connected to a pipe line under fluid pressure and the valve 20 set to apply fluid pressure to both ends of the piston and with the valve 28 open, the pressure within the cylinder will be the same under normal conditions and the piston 7 will remain in its closed position and likewise if piston 7 is in its open position and either valve 28 or 29 is open the pressure will be equal in both ends of the cylinder under normal conditions.

A self-contained valve incorporating the various features of the several valves in Fig. 1 is disclosed in U. S. Patent 2,337,841.

However, normal operating conditions of the pipe line are at times suddenly changed through pressure surges and if of sufficiently high rate and duration and the piston friction in the cylinder is sufficiently small the piston may abruptly move from its intended position and fully or partially open or close the valve A.

The reason for this is, the volume Y (space 10+12) in Fig. 1 is very much greater than the volume of space 11 with the result that the sudden rise in pressure increases the pressure in the space 11 much faster than it increases the pressure in the space Y, thus moving the piston.

The pressure difference across the piston so created may be sufficiently high and of sufficient duration to move the piston from its position shown in Fig. 1 namely, toward its open position. The amount of movement depends upon the last two factors, the movement obviously increasing the space 11 and decreasing the space Y thereby tending to reduce the pressure difference at the ends of the piston until a balance has been reached.

This inadvertent movement of the piston is considered particularly undesirable if it tends to open the valve A from a closed position.

It is the purpose of this invention to provide means to prevent the movement of the piston 7 under sudden increase in line pressure due to surge pressures.

Figures 2, 9:
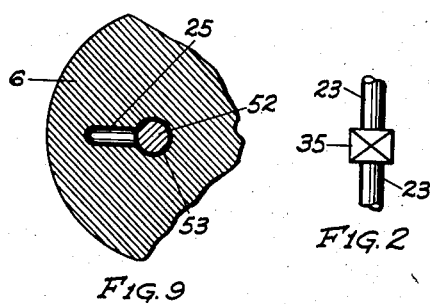
Fig. 2 represents a fitting to be applied to the operating system of Fig. 1 as later explained.
Fig. 9 is a section on the line 9—9 of Fig. 7.
Figure 3:
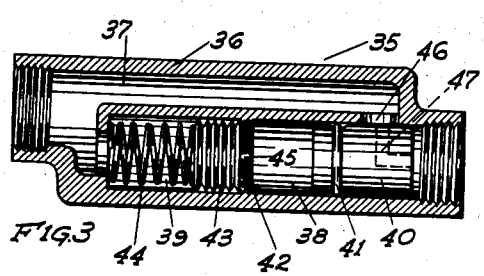
Fig. 3 is a longitudinal view in partial section of the fitting represented in Fig. 2 to prevent inadvertent movement of the piston in case of line surges.

Prevention of this inadvertent movement of the piston may be accomplished by placing restricting means in the pipe 23 as indicated schematically at 35 in Fig. 2 and one form of such restrictor is shown in detail in Fig. 3.

This restrictor comprises a casing 36 with chambers 37, 38 and 39, and threaded ends for inserting in series with the pipe 23 in Fig. 1. In chamber 38 is a piston 40 with packing 41, and separated from chamber 39 by a wall 42 which may be separately formed and screwed into place.

The chamber 39 is provided with a bellows 43 which has a sealed connection with the wall 42 as by soldering and a spring 44 tends to normally hold the bellows in a collapsed condition. The chamber 38 and bellows 43 are normally filled with a hydraulic fluid. A small opening 45 in the wall 42 permits the interflow of the hydraulic fluid as the piston 40 is moved and the bellows 43 alternately expanded and contracted with the movement of the piston 40.

When the valve A is connected in a pipe line and closed as in Fig. 1 and the restrictor 35 interposed in the pipe 23 as in Fig. 2 as previously described and the valve 20 set as shown, there will be equal line pressure on both ends of the piston 7, and the pressure will be the same on both ends of the piston 40 and the spring 44 will hold the piston 40 as in Fig. 3 and no flow of fluid line pressure will take place through the valve 20.

If now there should be a sudden increase of line pressure due to a surge its effect will be extended to the operating system of valve A and the increase in pressure over the normal line pressure will be suddenly impressed upon the piston 40 and move the same to its open position but such movement will be retarded by the slow flow of the hydraulic fluid in the chamber 38 through the restricted opening 45 and into the bellows 43 against the pressure of spring 44.

If the said pressure difference due to the surge is sufficiently high and sustained for a sufficient time the piston 40 will gradually force the hydraulic fluid in the chamber 38 into the bellows against the pressure of the spring 44 and the opening 46 into the chamber 37 uncovered wholly or in part.

Due to a small by-pass 47 through the piston 40, which is optional, the pressure at the ends of the piston 7 will gradually increase as the result of the surge but not sufficiently to effect movement of the piston 7 and as the surge pressure continues and if sufficiently great to overcome the spring 44, the surge pressure will enter the pipes 24 and 25 through the gradual uncovering of the opening 46, but with proper proportioning of the restrictor parts the sudden impact of the surge pressure on the piston at that end of the cylinder with the smaller space (11 in Fig. 1) will be greatly diminished if not entirely eliminated.

The restrictor 35 will not affect the normal operation of the operating system of the valve A as for instance if it is desired to move the piston 7 to the open position, the valve 20 will be operated clockwise which will connect pipe 25 directly with pipe 21 or 22, depending upon which port 3 or valve 28 or 29 is open and from which 4 pressure is to be taken and connect pipe 24 to atmosphere through pipe 30 thus releasing pressure on the one end of the piston 7 and starting the piston 7 to move and greatly reducing the back pressure on the piston 40 thereby permitting the line pressure to open the restrictor.

If the cylinder 2 is entirely empty of fluid pressure, then when the valve 20 is manipulated to permit the flow of fluid pressure to either end of the cylinder 2 and the other end to connect to atmosphere, the restrictor will very quickly open under line pressure and close again under pressure of spring 44 when the line pressure is reached in the one end of the cylinder or when the line pressure is allowed to equalize in both ends as in Fig. 1.

Another approach to the problem of preventing accidental movement of the piston 7 under surge pressures while the piston is subject to line pressure at both ends is to incorporate restricting means into the construction of valve A at either or both ends of the valve. In Figs. 4 to 8 inclusive such means is disclosed at that end of the valve occupied by the piston when valve A is closed and valve 20 open to both ends of the piston, as in Fig. 1; the restricting means checks the flow of fluid pressure into the space 11 of the piston while the flow is unrestricted into the space Y until the increase in pressure upon the upper end of the piston 7 as a result of the surge has become sufficiently equalized with that of the lower end of the valve to prevent inadvertent movement of the piston 7.

The effect of a surge upon the piston to move the same from its desired position will take place only when the valve is in its open or closed position with line pressure upon both ends of the piston as in Fig. 1.

Figure 4:
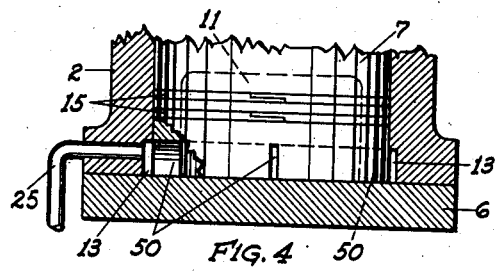
Fig. 4 is a partial section of the lower end of the valve shown in Fig. 1 including means for preventing the effect of surges on the piston.

In Fig. 4, the piston, shown in Fig. 1, is provided with one or more narrow slots 50 which communicate with the space 11 and the annular recess 13. The number and size of the slots 50 will be determined from a prior check of the characteristics of the line.

While the pressure due to a surge is gradually building up in the space 11, it will be building up unrestricted in the space Y in the other end of the cylinder 2 and there may be very little or no movement at all of the piston 7 due to surge pressure.

Figure 5:
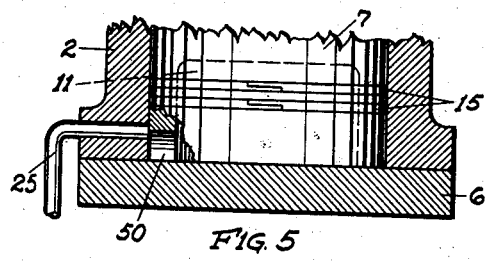
Figs. 5 and 6 are partial sections of the lower end of the valve in Fig. 1 showing modifications of the improvement shown in Fig. 4.

Fig. 5 is very similar to Fig. 4 except the chance of the surge pressure acting upon the piston is very much reduced as there is only a single slot 50 disclosed and the inlet pipe 25 is partially covered by the piston wall. The full effect of any surge pressure is not present until the inlet of pipe 25 is fully uncovered as the piston rises.

Figure 6:
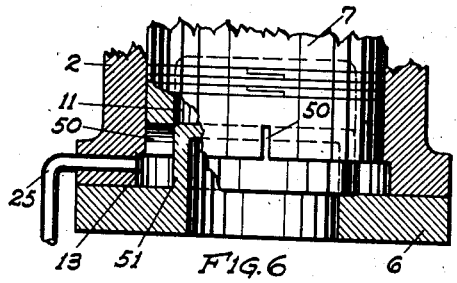

Fig. 6 is a modification of Fig. 4 in that an inner sleeve 51 is provided which fits the inner side wall of the space 11. This reduces the exposed area of the end face of the piston thus still further reducing the chance of the surge pressure moving the piston. The piston is shown raised to a point where the upper part of the slots 50 are about to pass the upper edge of the sleeve 51 whereupon pressure will enter the space 11 above the sleeve 51 and thereby act upon the entire lower end of the piston 7.

This sleeve 51 will not retard the operation of the piston when it is intended to move the piston under normal operation as in that case the valve 20 will connect the upper end of the cylinder 2 to atmosphere and the line pressure acting upon the lower exposed face of the piston will cause it to move promptly until the slots 50 are uncovered with respect to the sleeve 51.

Normal operation of the piston in Figs. 4, 5 and 6 will not be affected by the retarding means disclosed for the reason that the other end of the cylinder will be exhausting to atmosphere while full line pressure is acting upon the lower or retarded end.

Figure 7:
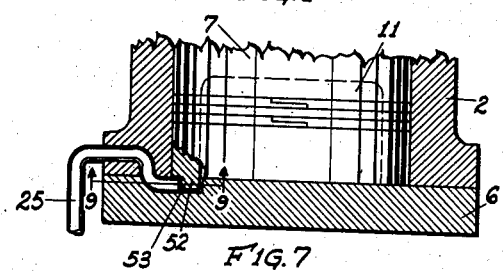
Figs. 7 and 8 are partial sections of the lower end of the valve shown in Fig. 1 showing still further modifications of this invention.

Fig. 7 is a still further modification of a means to retard the effect of the surge pressure or to entirely prevent any movement of the piston depending upon the intensity of the surge and its duration as previously referred to. The piston is provided with an extending plug 52 which is preferably round, Fig. 9, and fits loosely in a recess 53 in the cylinder head and cooperating therewith to substantially close the opening of the pipe 25 until pressure leaking into the space 11 causes the piston to rise slowly or not at all under a surge, but quite rapidly under a normal operation of the piston.

Figure 8:
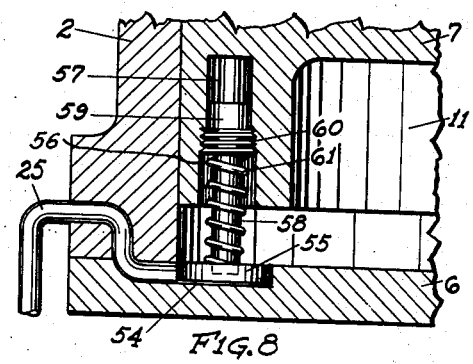

Fig. 8 is a form of this invention in which a spring-held check is incorporated in the operating system. The piston 7 is shown in a partially closed position.

In Fig. 8 the cylinder head 6 is provided with a recess 54 which may be round as in the case of the recess 53, Fig. 9, and in the recess is fitted a check 55 allowing clearance therearound. The plug is a partial closure for the end opening of the pipe 25.

The side wall of the piston 7 has a bore 56 and an extension thereof 57 of lesser diameter. Mounted in the bores 56 and 57 is a stem 58 with a head 59 and held in place by a threaded nut 60. The lower end of the stem 58 is secured to the check 55.

The check 55 and stem 58 are biased to yieldingly hold the check 55 in the recess 54 by a spring 61 and the stem and its head are arranged to reciprocate in the bores 56 and 57.

When the valve A is closed and the piston in its fully closed position and line pressure on both ends of the piston, as in Fig. 1, and the piston 7 subjected to a surge pressure, such pressure in excess of line pressure is impressed upon the piston at both ends thereof but the check 55 will restrict the flow of fluid pressure into the cylinder at the lower end of the piston due to the surge but the flow is unrestricted at the other end of the cylinder, therefore the excess pressure due to the surge may be substantially equal in both ends of the cylinder before the piston can start to move.

When the piston 7 (Fig. 8) is in its normal closed position, Fig. 1, and it is desired to move the piston to its open position, as previously stated the valve 20 is moved clockwise thereby connecting the pipe 24 to atmosphere and supplying line pressure to the lower end of the bore through pipe 25 and the fluid pressure leaking past the check 55 will quickly fill the space 11 allowing the piston to rise until the check 55 clears the recess 54 thus admitting a free flow of fluid pressure to the cylinder and forcing the piston to its open position.

By closing the upper end (Fig. 1) of the piston the same as at the lower end the value of Y will be greatly reduced from that shown in Fig. 1 thus permitting quicker equalization of the surge pressure at the ends of the piston in the case of the constructions shown in Figs. 4 to 8 inclusive.

Preliminary tests should be made as to the line characteristics to harmonize the valve operation to meet the requirements.

The pipes 21 and 22 may connect directly to the connected pipe line adjacent the valve A.

Fluid pressure refers to the pressure of the medium carried by the pipe line such as gas, oil, water, etc.

As the invention may be carried out in a variety of different ways, without departing from the spirit or essential characteristics thereof, what is claimed and desired to be secured by United States Letters Patent is:

1. Fluid pressure control apparatus for use with a pipe line valve of the type described comprising a casing having inlet and outlet ports, a chamber in said casing opening to said ports, a second chamber opening to said outlet port and communicating through a restricted passageway with the first chamber, a piston in said first chamber for reciprocating motion to open and close one of said ports, a bellows in the second chamber having an open end surrounding and sealing said passageway from the second chamber, and spring means associated with the bellows to resiliently oppose expansion of said bellows and motion of the piston under fluid pressure surges to open one of said ports.

2. Fluid pressure control apparatus for use with a pipe line valve of the type described comprising a casing having inlet and outlet ports, a chamber in said casing opening to said ports, a second chamber in the casing communicating with the outlet port, a common end wall for the chambers, a restricted passageway through said end wall communicating with said chambers, a piston substantially fluid-tightly mounted in said first chamber for reciprocating motion to open and close the outlet port, a passageway through the piston to connect the ports for restricted fluid flow therebetween when the piston stands between said ports, a bellows in the second chamber having an open end sealingly secured to said end wall around one end of the passageway, and spring means associated with the bellows to resiliently oppose expansion of said bellows and motion of the piston under live fluid pressure surges to open one of said ports.

3. A valve comprising a body having an inlet port, an outlet port and a piston bore between said ports, a hollow, open-ended piston movable endwise in said bore and having a passage therethrough to connect said ports partly defined by longitudinally spaced transverse walls in the piston and openings in opposed walls of the piston between said transverse walls, one of said walls being adjacent to one end of the piston and the other wall being remote from the other end of the piston, said walls partly defining chambers in the ends of said bore, the chamber partly defined by the latter wall being larger than the other chamber in all positions of the piston in the bore, a first conduit connecting said ports outside of said body, a second conduit connecting the ends of said bore, a valve connecting the first conduit with the second conduit, and restriction means associated with the second conduit for retarding the entrance of fluid pressure into the smaller chamber during fluid pressure surges in said first conduit.

4. A valve comprising a body having an inlet port, an outlet port and a piston bore between said ports, a hollow, open-ended piston movable endwise in said bore and having a passage therethrough to connect said ports partly defined by longitudinally spaced transverse walls in the piston and openings in opposed walls of the piston between said transverse walls, one of said walls being adjacent to one end of the piston and the other wall being remote from the other end of the piston, said walls partly defining chambers in the ends of said bore, the chamber partly defined by the latter wall being larger than the other chamber in all positions of the piston in the bore, a first conduit connecting said ports outside of said body, a second conduit connecting the ends of said bore, a valve connecting the first conduit with the second conduit, and restriction means in valve body and carried by the piston to retard the flow of fluid pressure into the smaller chamber during fluid pressure surges in the first conduit.

5. A valve comprising a body having an inlet port, an outlet port and a piston bore between said ports having a recess in one end wall, a hollow, open-ended piston movable endwise in said bore and having a passage therethrough to connect said ports partly defined by longitudinally spaced transverse walls in the piston and openings in opposed walls of the piston between said transverse walls, one of said walls being adjacent to one end of the piston and the other wall being remote from the other end of the piston, said walls partly defining chambers in the ends of said bore, the chamber partly defined by the latter wall being larger than the other chamber in all positions of the piston in the bore, a first conduit connecting said ports outside of said body, a second conduit connecting the ends of said bore, a valve connecting the first conduit with the second conduit, and means at one end of the piston opposing said bore end wall recess cooperating with the second conduit for restricting flow of fluid pressure into the smaller chamber, said means comprising a plug integrally formed with and extending from the piston to fit into said recess.

6. A valve comprising a body having an inlet port, an outlet port and a piston bore between said ports, a hollow, open-ended piston movable endwise in said bore and having a passage therethrough to connect said ports partly defined by longitudinally spaced transverse walls in the piston and openings in opposed walls of the piston between said transverse walls, one of said walls being adjacent to one end of the piston and the other wall being remote from the other end of the piston, said walls partly defining chambers in the ends of said bore, the chamber partly defined by the latter wall being larger than the other chamber in all positions of the piston in the bore, a first conduit connecting said ports outside of said body, a spaced conduit connecting the ends of said bore, a valve connecting the first conduit with the second conduit to control the flow of fluid through said conduit, and means in the second conduit for restricting the flow of fluid pressure into the smaller piston bore chamber, said means comprising a casing having inlet and outlet ports, a chamber in said casing opening to said ports, a second chamber opening to said outlet port and communicating through a restricted passageway with the first casing chamber, a piston in said first casing chamber for reciprocating motion to open and close one of said ports, a bellows in the second chamber having an open end surrounding and sealing one end of said passageway from the second casing chamber, and spring means associated with the bellows to resiliently oppose expansion of the bellows and motion of the piston under fluid pressure surges to open said one of said ports.

JOSEPH T. LUSIGNAN, JR.

References Cited in the file of this patent

UNITED STATES PATENTS

| Number | Name | Date |
|---|---|---|
| 244,092 | Thayer | July 12, 1881 |
| 824,425 | Johnson | June 26, 1906 |
| 988,495 | Noyes | Apr. 4, 1911 |
| 1,815,394 | Boosey | July 21, 1931 |
| 2,130,611 | Burdick | Sept. 20, 1938 |
| 2,337,841 | Shafer | Dec. 28, 1943 |
| 2,432,996 | Larson | Dec. 23, 1947 |
| 2,518,871 | Craig | Aug. 15, 1950 |
| 2,585,556 | Johnson | Feb. 12, 1952 |

FOREIGN PATENTS

| Number | Country | Date |
|---|---|---|
| 21,543 | Great Britain | Nov. 8, 1894 |
| 339,086 | France | of 1904 |